Figure 1:
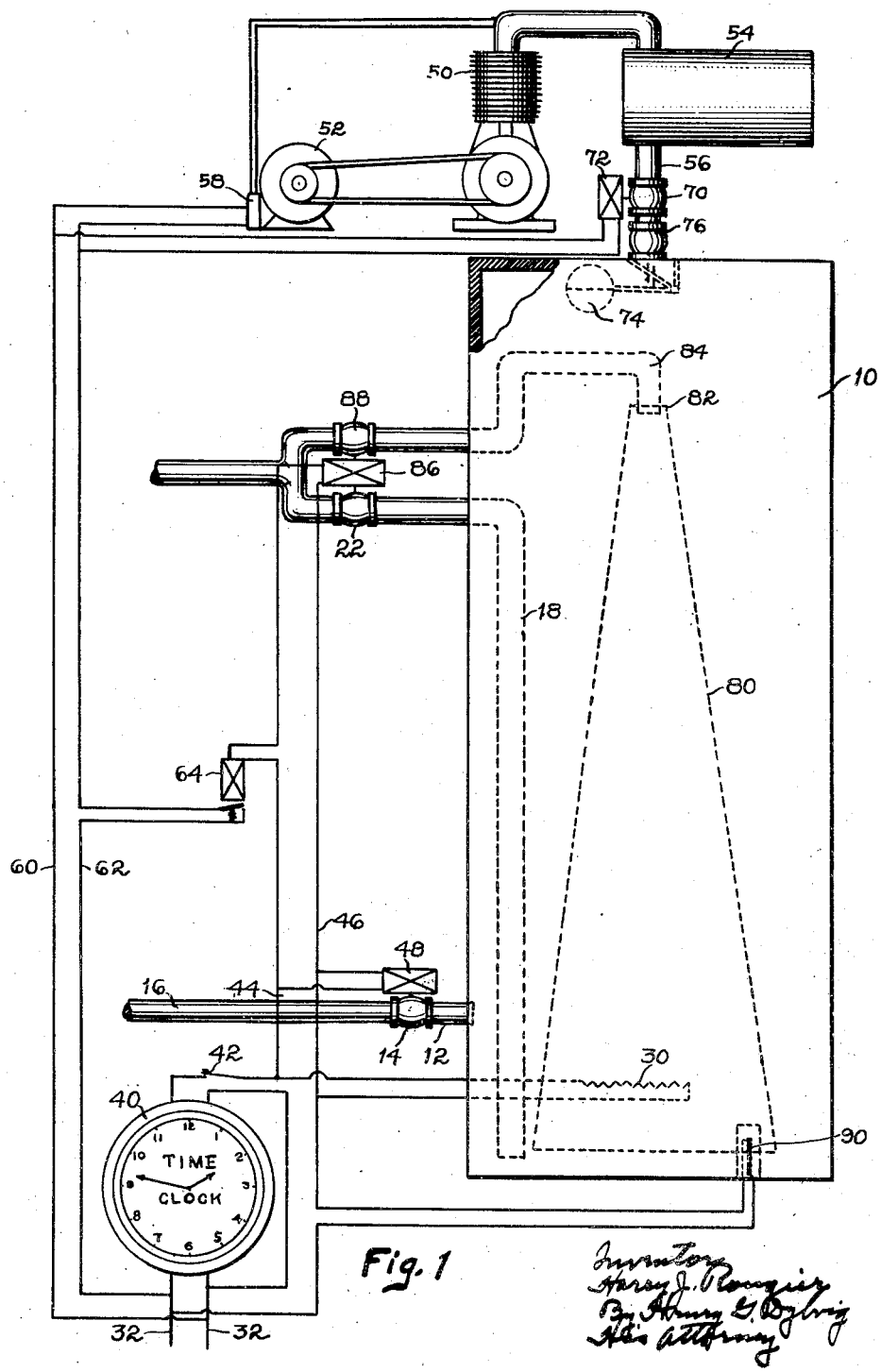

Sept. 10, 1946.                H. J. ROUGIER                 2,407,453
                           OFF PEAK HOT WATER HEATER
                    Filed May 18, 1944              2 Sheets-Sheet 1

Patented Sept. 10, 1946

2,407,453

UNITED STATES PATENT OFFICE 2,407,453

OFF-PEAK HOT-WATER HEATER

Harry J. Rougier, Dayton, Ohio

Application May 18, 1944, Serial No. 536,170

19 Claims. (Cl. 219—39)

This invention relates to water heaters and more particularly to the efficient operation of water heaters.

An object of this invention is to provide an electric water heater wherein the water may be heated during an off-peak load period and the water supplied to its uses without mixing with cold water, so that the water that is supplied retains the initial temperature less the heat losses.

Another object of this invention is to provide an electric water heater of the off-peak type, wherein the source of water supply is interrupted after the water in the electric heater has been heated and the water in the electric heater is supplied to the consumer by compressed air, so as to prevent the hot water being cooled by cold water entering the hot water heater.

Another object of this invention is to provide a tubular partition in the hot water heater, so that as the water is heated by the hot water heater, the hot water is immediately conducted to the top of the water, so that the upper portion of the water is heated to a higher temperature, thereby permitting the upper portion to be withdrawn as hot water shortly after the heating operation is initiated.

Another object of this invention is to provide an attachment for water heaters, which attachment controls the flow of water into and out of the water heater so as to supply hot water without cooling the water in the heater by the addition of cold water.

Other objects and advantages reside in the construction of parts, the combination thereof and the mode of operation, as will become more apparent from the following description.

Referring to the drawings,

Figure 1 discloses an electrical hot water heater of the off-peak type, with the wiring diagram shown schematically.

Figure 2:
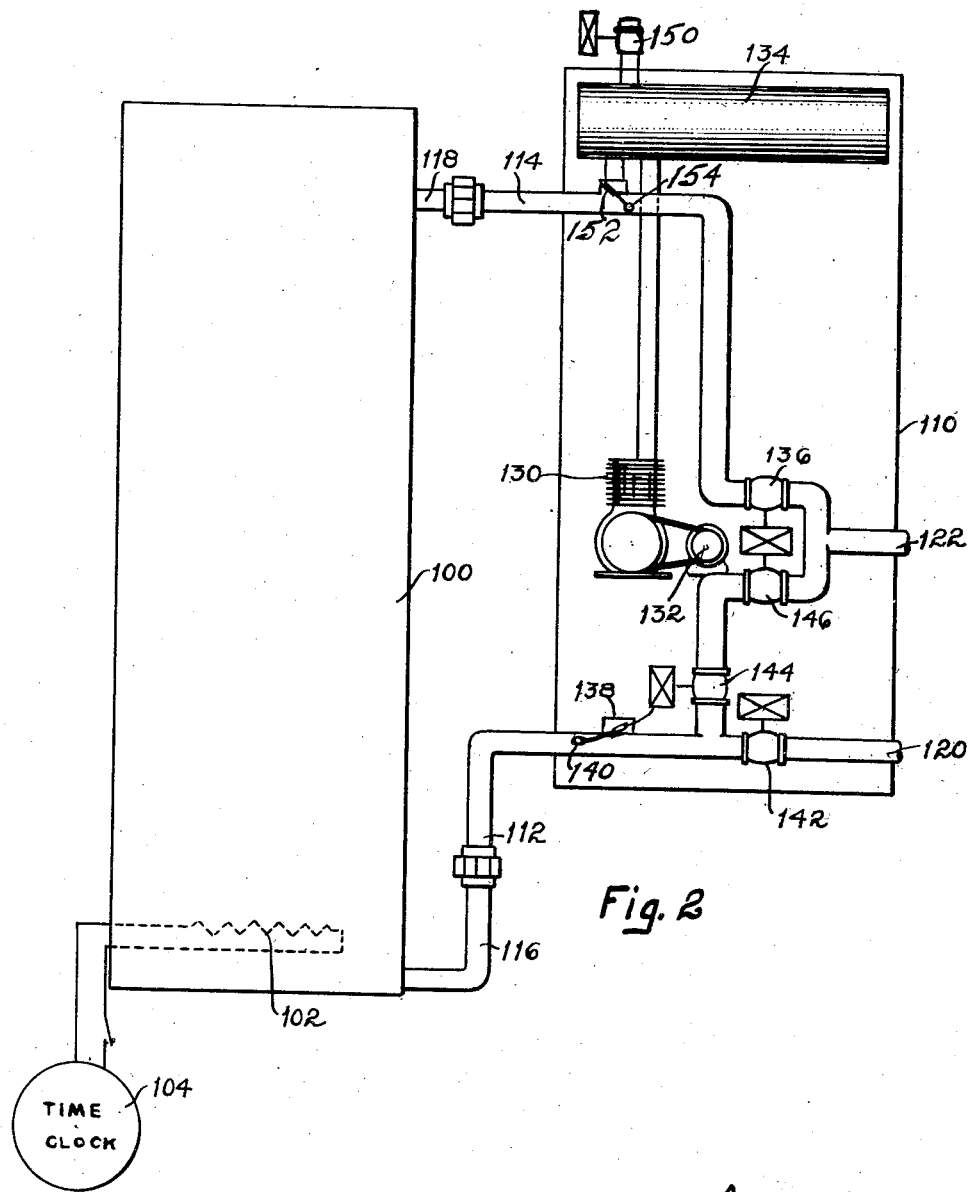

Figure 2 discloses a modification utilizing an attachment with the wiring diagram shown only in part.

In the drawings, the reference character 10 indicates an insulated hot water storage tank. It is filled from a suitable conduit 12 connected by a suitable valve 14 to a water main 16, as will appear more fully later. Water is usually withdrawn through a pipe 18, terminating near the bottom of the tank, so as to fully empty the tank, and is supplied to the user through a suitable valve 22.

The water is heated by means of an electric heater element 30 connected through suitable switch mechanism to electric lines 32. The use of an insulated storage tank, electric heater element, an intake pipe and a water withdrawing pipe is broadly old and may be referred to as substantially standard equipment in off-peak electric heaters, with the exception of the positioning of the various elements.

By off-peak electric water heaters is designated a system of heating water usually shortly after midnight when the demand for electricity is normally low and therefore the power companies are willing to furnish electricity at greatly reduced rates. For example, where the normal rate may be on the order of three or four cents per kilowatt hour, the power companies may furnish power for heating water during the off-peak load period for a price on the order of one cent per kilowatt hour.

The current is automatically turned on and off by an electric time clock 40 actuating a switch 42 by suitable mechanism not shown. When the off-peak period arrives, the clock 40 automatically closes the switch 42. A pair of electric leads 44 and 46 are connected in parallel with the heater element 30. These leads 44 and 46 energize an electromagnet 48, actuating the valve 14, so as to open this valve whenever the heater element 30 is energized. The valve 14 is automatically closed immediately upon the current through the heater element being interrupted. This allows the cold water to flow into the water heater from the water main only when the heater element 30 is energized. By this arrangement no cold water is added to the tank or reservoir when the heater element 30 is de-energized.

The water in the reservoir is maintained under pressure at all times by an automatic air pressure pump 50 driven by a suitable electric motor 52 and compressing air in a tank 54 connected by a pipe 56 to the top of the reservoir 10. A suitable pressure responsive switch 58 is used for opening and closing the motor circuit, as is well known to those skilled in the art. This pressure responsive switch may be adjusted to maintain a predetermined pressure in the tank 54. For example, the upper limit may be 65# and the lower limit 40#, or any other suitable pressure. The electric motor 52 is normally energized from the lines 32 through suitable leads 60 and 62. An electromagnetic switch 64 open-circuits the lead 62 whenever the heater element 30 is energized, in that pressure is then supplied to the tank from the water mains. This interrupts the operation of the motor 52 and the compressor 50. A valve 70 is connected in the pipe line 56. The valve 70 is controlled by an electromagnet 72, normally energized from the leads 60 and 62. When the electromagnet 72 is energized, the valve 70 connects the pipe 56 to the tank 10. Whenever the electromagnet 72 is de-energized, the valve 70 closes the passage through the pipe 56 and opens an exhaust vent, permitting the air in the tank 10 to escape, thereby releasing the pressure above the water in the tank 10. This permits the tank to be filled with cold water without the air pressure interfering with the filling operation. In order to prevent the tank 10 from overflowing through the exhaust valve, a float 74 closes the valve 76 whenever the water level reaches the top of the tank or reservoir 10.

If water has been withdrawn from the tank when the off-peak load period arrives, the water in the tank is chilled by the cold water that is admitted through the intake opening. In the event water is drawn from the system during this period, the water would be quite cold, especially if drawn through the pipe 18, in that the coldest water is found near the bottom of the reservoir. In order to supply warm water as quickly as possible, a frustro-conical member 80, shown in dotted lines in Figure 1, is inserted over the heater element 30 and terminates in a small opening 82 at the top thereof. This results in the water, as it is being heated, rising to the top of the frustro-conical member 80. A pipe 84 is mounted in the opening 82 and is used for withdrawing water during the period that the water in the reservoir is being heated. This takes the place of the pipe 18. This has been accomplished by utilizing an electromagnet 86, normally de-energized and connected in parallel with the heater element 30, so as to be energized whenever the heater element is energized. This electromagnet 86 closes the valve 22 and opens the valve 88 in the pipe 84, so that the water that is withdrawn is the warmest water in the reservoir. The diameter of the pipe 84 is less than the diameter of the opening 82, so as to permit circulation of the water and so as to thereby force the cold water into contact with the heater element. Whenever the water in the reservoir reaches the desired temperature, a thermostat 90 connected in series with the heater element 30 open-circuits the heater element, so as to interrupt the heating of the water. In the event water is withdrawn from the reservoir or the water in the reservoir cools, due to radiation and other heat losses, previous to the time that the off-peak load period expires, the thermostat 90 may close and again cause the heater element 30 to heat the water.

After the expiration of the off-peak load period, no heat will be supplied to the heater element 30, irrespective of the thermostat 90. Whenever the circuits through the heater element are de-energized, for any reason whatsoever, the valve 14 will be closed automatically, the switch 64 closed, the valve 22 opened, the valve 88 closed, the valve 70 opened to the pipe 56 and the air exhaust closed and the compressor motor energized as needed. When this condition arises, no water is admitted to the reservoir. The hot water is withdrawn through the pipe 18 and the water forced out of the tank by air pressure supplied by the compressor 50. This results in hot water being supplied without the addition of cold water, thereby supplying hot water of a substantially uniform temperature throughout the entire day or until the hot water is exhausted.

In order to preclude air discharging through the hot water mains when the water level is slightly below the outlet conduit 18, a suitable float valve or a float switch is inserted near the bottom of the tank or reservoir 10 actuating a valve, not shown, in the pipe 18. Such an electromagnetic valve controlled by a float switch is shown and will be described in connection with the description of Figure 2. Such a float mechanism is preferably so mounted that the water level cannot drop below the intake of the conduit 18. The float mechanism automatically closes the valve in the conduit 18 before air can escape.

In the modification disclosed in Figure 2, an electric water heater 100 has been shown as representative of conventional water heaters. A suitable heater element 102 is used for heating the water, which heater element is controlled by a time clock 104. An auxiliary unit 110 is provided with two connections 112 and 114, adapted to be connected to the intake pipe 116 and the hot water pipe 118. This unit 110 may be sold for attachment to the conventional water heaters. This unit supplies air pressure and controls the flow of water so as to supply hot water during the day, without cooling the water with the addition of cold water. This unit 110 is provided with a pipe or conduit 120 adapted to be connected into the water main for supplying cold water and another pipe 122 adapted to be connected into the hot water outlet.

When forcing water from the hot water heater by means of compressed air, it is not feasible to withdraw the water from the hot water pipe found near the top of the hot water heaters, for the reason that the air would escape through this pipe whenever the water falls below the level of the intake of the pipe. That being the case, the hot water pipe found on the conventional hot water heater is used as an air conduit whenever water is withdrawn during all times excepting the off-peak load period. The water is withdrawn through the pipe found in the bottom of the hot water heater. This same pipe functions as a refilling pipe when the hot water heater is being refilled. The mechanism for accomplishing the reversal of the pipes, together with the compressor, will now be described.

Compressed air is supplied by an air compressor 130 driven by a suitable electric motor 132 that supplies compressed air to a tank 134 connected to the pipe 114. A valve 136, connected in the pipe 114, is normally closed, so that the air from the compressor 130 will not flow out through the hot water pipe 122. A valve 138, which has been shown as controlled by a float 140, is mounted in the pipe 112. This valve is so arranged that in the event the water is drained from the tank or reservoir 100, the valve 138 will be closed, so as to prevent air from escaping into the hot water mains. A valve 142 connects pipe 112 to pipe 120 and is also normally closed, so as to shut off the water from the water mains, so that no cold water enters the reservoir or tank. A valve 144 and a valve 146 are both open during normal operation, so that hot water is supplied from the reservoir or tank 100 through the pipes 116 and 112 through the valves 144 and 146 to the hot water pipe 122. By this arrangement, what is normally the intake pipe in conventional hot water heaters, now becomes the hot water outlet pipe.

The position of the various valves, as described above, represents the position of these valves during normal operation when the water in the reservoir 100 is not being heated. Whenever the time clock 104 causes the heater element 102 to be energized, the valves in the system have to be opened or closed, as the case may be, so as to supply cold water through the conventional cold water pipe and withdraw hot water during the heating operation through the conventional hot water outlet pipe. This has been accomplished in part by electromagnetic valves which are automatically opened whenever the time clock closes the circuit through the heater element. The wiring diagram has not been shown, as this can easily be supplied.

The electromagnet controlling the valves 136 and 146 has its terminals connected in parallel across the terminals of the heater element 102. This electromagnet opens the valve 136 and closes the valve 146. The electromagnet controlling the valve 142 is also connected across the terminals of the heater element 102 and opens the valve 142 when the time clock closes the circuit through the heater element. This results in water being supplied to the hot water heater from the cold water mains. As this water is usually under high pressure, it takes only a short period of time for the reservoir to be filled with water.

The compressor motor circuit is open-circuited whenever the heater element is energized, as the air pressure over the water in the tank is not then needed. Instead, the air pressure must be released to permit the tank to be filled with water.

A valve 150, also controlled by an electromagnet, is opened. This valve 150 is connected to the air tank 134 and releases the air pressure. The electromagnet controlling this valve is connected across the terminals of the heater element. A valve 152, shown schematically, is controlled by a float 154 and closes the air passage to the tank 134 whenever water flows through the pipe 114. This condition is attained when enough water has been supplied to the system from the supply main to raise the water level above the intake of the pipe 114. The closing of the valve 152 by the float 154 is to prevent water entering into the tank 134 and into the compressor 130. When the water reaches the level of this pipe and there is a demand for hot water, the hot water is supplied from the pipe 114. The pressure is then supplied from the water mains. Whenever the electricity through the heater element 102 is interrupted for any reason whatsoever, the valves 136 and 150 are closed and the valves 142 and 146 are opened. This causes the hot water to be drained from the reservoir through the pipe 116, up through the valves 144 and 146. The valve 144 is controlled by a float 140 actuating a mercury type of switch 138, causing the valve 144 to be closed in the event the float 140 is allowed to drop, due to the absence of water in the pipe. This float 140 actuates the mercury type switch 138 so as to close the valve 144 when the water in the tank 100 is exhausted, to thereby prevent air from escaping through the spigots instead of water. The valve 144 closes the hot water pipe when the water in the reservoir has been utilized. The float 154 could also be connected to a mercury type switch and this used in energizing an electromagnet controlling a valve. Such conduit and float may be made of such size and shape as to be inserted through the opening in the tank 100 normally occupied by pipe 118.

In the preferred embodiment and in the modification electromagnetic valves have been disclosed and described. Instead of electromagnetic valves, any other suitable valve mechanism could be used. For example, a one revolution motor could be used in actuating the valves from one position to another, this motor being controlled by the voltage supplied to the heater element.

Furthermore, the system has been described in connection with electric water heaters. This system is substantially equally applicable to gas heaters, oil heaters and other fuel heaters where it may be desirable to heat a large quantity of water and then utilize the entire quantity of water or utilize the water for a definite period of time before again heating the water. At the time the water is ready to be heated, the tank or reservoir would obviously be replenished with a new supply of water.

All of the valves could be controlled by thermostatic means including the valves for supplying the fuel to the heater. Furthermore, the system could be caused to be energized in response to the water level dropping below a predetermined level, as for example, by a float that could actuate a valve, initiating the operation of the heater unit, whatever type of heater unit may be used.

In the preferred embodiment, instead of using two pipes within the tank, one for withdrawing hot water under normal operations and the other for withdrawing hot water when the water is being heated, a flexible conduit member could be utilized in association with a float, which flexible conduit member has its opening a very short distance below the top of the water level.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A hot water heater system including a reservoir, a heater element for heating the water in the reservoir, means for periodically filling the reservoir with water, means responsive to the periodic means for causing the heater element to heat the water, a conduit extending from the reservoir for supplying hot water, and pressure means acting on the water independent of gravity for forcing the hot water out of the reservoir through said conduit without replenishing the water supply.

2. A hot water heater system including a reservoir, a heater element for heating the water in the reservoir, a conduit for supplying the water from the water mains to the reservoir, an outlet conduit for supplying hot water from the reservoir, valve means in the first conduit, control means for periodically opening the valve means to replenish the water in the reservoir and for causing the heater element to heat the water in the reservoir, and means independent of gravity for causing the hot water to flow from the reservoir through the outlet conduit so as to supply hot water without replenishing the hot water with cold water.

3. A hot water heater system including a reservoir, a heater element for heating the water in the reservoir, a conduit for supplying the water from the water mains to the reservoir, an outlet conduit for supplying hot water from the reservoir, a normally closed valve in the first conduit, means for periodically opening the valve in the first conduit to replenish the water in the reservoir and for causing the heater element to heat the water in the reservoir, and means for supplying compressed air to the reservoir so as to supply hot water under pressure to the hot water conduit without replenishing the reservoir with cold water.

4. A hot water heater system including a reservoir, a heater element for heating the water in the reservoir, means for periodically supplying water to be heated to the reservoir, an outlet conduit for the hot water, and means for supplying compressed air to the reservoir to maintain the water in the reservoir under pressure as it is withdrawn from the reservoir to the outlet conduit without replenishing the water supply in the reservoir.

5. A hot water heater system including a reservoir, a heater element for heating the water in the reservoir, means for periodically supplying water to be heated to the reservoir, an outlet conduit for the hot water, air compressor means operating automatically to supply compressed air to the reservoir so as to maintain a predetermined pressure head on the water in the reservoir without replenishing the water in the reservoir with cold water.

6. A hot water heater system including a reservoir, a heater element for heating the water in the reservoir, means for supplying cold water to the reservoir, said means including a normally closed valve, a time clock for periodically opening said valve, said time clock causing the heater element to heat the water supplied to the reservoir through said conduit, an outlet conduit, and means for supplying compressed air to the hot water in the reservoir to force the water through said outlet conduit as needed.

7. A hot water heater system including a reservoir, a heater element for heating the water in the reservoir, means for supplying cold water to the reservoir, said means including a normally closed valve, a time clock for periodically opening said valve, said time clock causing the heater element to heat the water supplied to the reservoir through said conduit, an outlet conduit, and means for supplying compressed air to the hot water in the reservoir to force the water through said outlet conduit as needed.

8. An electric hot water heater of the off-peak load type wherein an electric clock mechanism is used in actuating a switch for closing the electric circuit through the heater element during the off-peak of the electric load demand, said electric water heater system including means for periodically supplying water to the reservoir of the water heater, said means being controlled by the electric clock so as to replenish the water in the reservoir to be heated during the off-peak load period, and means for forcing the hot water from the hot water heater during the period when the current of the heater element is interrupted so as to supply hot water without the addition of cold water.

9. An electric hot water heater of the off-peak load type wherein an electric clock mechanism is used in actuating a switch for closing the electric circuit through the heater element during the off-peak of the electric load demand, said electric water heater system including means for periodically supplying water to the reservoir of the water heater, said means being controlled by the electric clock so as to replenish the water in the reservoir to be heated during the off-peak load period, and air compressor means for supplying pressure to the water in the reservoir so as to supply hot water under pressure without adding cold water in the reservoir.

10. An attachment for an electric hot water heater of the off-peak load type wherein an electric clock mechanism is used for closing the electric circuit through the heater element during the off-peak electric load demand period, said attachment including a conduit attached to the cold water intake of the hot water heater, valve means for using said conduit in supplying water to the reservoir to be heated when the heater element is energized, a second valve means for converting said conduit from a cold water supply means to a hot water outlet, said second valve means opening the conduit from the reservoir to the hot water outlet whenever the heater element is de-energized, both of said valve means being controlled by the electric clock mechanism so as to cause the opening and the closing of the valves in predetermined time relation with respect to the energization of the heater element.

11. An attachment for an electric hot water heater of the off-peak load type wherein an electric clock mechanism is used for closing the electric circuit through the heater element during the off-peak electric load demand period, said attachment including a conduit attached to the cold water intake of the hot water heater, valve means for using said conduit in supplying water to the reservoir to be heated when the heater element is energized, a second valve means for converting said conduit from a cold water supply means to a hot water outlet, said second valve means opening the conduit from the reservoir to the hot water outlet whenever the heater element is de-energized, both of said valve means being controlled by the electric clock mechanism so as to cause the opening and the closing of the valves in predetermined time relation with respect to the energization of the heater element, and means for supplying compressed air to the hot water reservoir when the heater element is deenergized.

12. An attachment for an electric hot water heater of the off-peak load type wherein an electric clock mechanism is used for closing the electric circuit through the heater element during the off-peak electric load demand period, said attachment including a conduit attached to the cold water intake of the hot water heater, valve means for using said conduit in supplying water to the reservoir to be heated when the heater element is energized, a second valve means for converting said conduit from a cold water supply means to a hot water outlet, said second valve means opening the conduit from the reservoir to the hot water outlet whenever the heater element is de-energized, both of said valve means being controlled by the electric clock mechanism so as to cause the opening and the closing of the valves in predetermined time relation with respect to the energization of the heater element, means for supplying compressed air to the hot water reservoir when the heater element is de-energized, and a relief valve for releasing the air pressure supplied to the water in the reservoir when the water in the reservoir is being replenished with cold water.

13. An attachment for an electric hot water heater of the off-peak load type wherein an electric clock mechanism is used for closing the electric circuit through the heater element during the off-peak electric load demand period, said attachment including a conduit attached to the cold water intake of the hot water heater, means for interconnecting said conduit to the cold water main when replenishing the water in the heater in readiness to be heated and for connecting the conduit to the hot water outlet, said means responding to the clock mechanism, and means for supplying compressed air through the conduit normally used as a hot water outlet conduit for maintaining pressure on the hot water so that the water in the reservoir may be withdrawn when the heater element is de-energized without the addition of cold water.

14. An attachment for an electric hot water heater of the off-peak load type wherein an electric clock mechanism is used for closing the electric circuit through the heater element during the off-peak electric load demand period, said attachment including a conduit attached to the cold water intake of the hot water heater, means for interconnecting said conduit to the cold water main when replenishing the water in the heater in readiness to be heated and for connecting the conduit to the hot water outlet, said means responding to the clock mechanism, and air compressor means for supplying compressed air to the reservoir when the heater element is de-energized to thereby permit the withdrawal of hot water without the addition of cold water to the reservoir.

15. An attachment for an electric hot water heater of the off-peak load type wherein an electric clock mechanism is used for closing the electric circuit through the heater element during the off-peak electric load demand period, said attachment including a conduit attached to the cold water intake of the hot water heater, means for interconnecting said conduit to the cold water main when replenishing the water in the heater in readiness to be heated and for connecting the conduit to the hot water outlet, said means responding to the clock mechanism, air compressor means for supplying compressed air to the reservoir when the heater element is de-energized to thereby permit the withdrawal of hot water without the addition of cold water to the reservoir, and means for releasing the air pressure in the reservoir when the water in the reservoir is being replenished.

16. An attachment for an electric hot water heater of the off-peak load type wherein an electric clock mechanism is used for closing the electric circuit through the heater element during the off-peak electric load demand period, said attachment including a conduit attached to the cold water intake of the hot water heater, means for interconnecting said conduit to the cold water main when replenishing the water in the heater in readiness to be heated and for connecting the conduit to the hot water outlet, said means responding to the clock mechanism, means for supplying compressed air through the conduit normally used as a hot water outlet conduit for maintaining pressure on the hot water so that the water in the reservoir may be withdrawn when the heater element is de-energized without the addition of cold water, and means for releasing the air pressure in the reservoir when the water in the reservoir is being replenished.

17. An attachment for an electric hot water heater of the off-peak load type wherein an electric clock mechanism is used for closing the electric circuit through the heater element during the off-peak electric load demand period, said attachment including a conduit attached to the cold water intake of the hot water heater, valve means for using said conduit in supplying water to the reservoir to be heated when the heater element is energized, a second valve means for converting said conduit from a cold water supply means to a hot water outlet, said second valve means opening the conduit from the reservoir to the hot water outlet whenever the heater element is de-energized, both of said valve means being controlled by the electric clock mechanism so as to cause the opening and the closing of the valves in predetermined time relation with respect to the energization of the heater element, and means for closing the hot water outlet pipe when the water supply in the reservoir has been exhausted so as to prevent the compressed air from escaping through the hot water mains.

18. A hot water heater system including a reservoir, a heater element for heating the water in the reservoir, means for periodically filling the reservoir with water, means responsive to the periodic means for causing the heater element to heat the water, a conduit extending from the reservoir for supplying hot water, said conduit having a pair of branches within the reservoir, one of which extends to a point near the top of the reservoir for withdrawing water during the period that the heater element is energized, and the other extending to a point near the bottom of the reservoir for withdrawing water during the period that the heater element is de-energized, and valve means for selecting the branch to be used.

19. A hot water heater system including a reservoir, a heater element for heating the water in the reservoir, means for periodically filling the reservoir with water, means responsive to the periodic means for causing the heater element to heat the water, a conduit extending from the reservoir for supplying hot water, and means for forcing the hot water out of the reservoir through said conduit without replenishing the water supply, said last mentioned means being capable of forcing the water to a higher level than the water supply in the reservoir.

HARRY J. ROUGIER.